United States Patent Office 3,090,897
Patented May 21, 1963

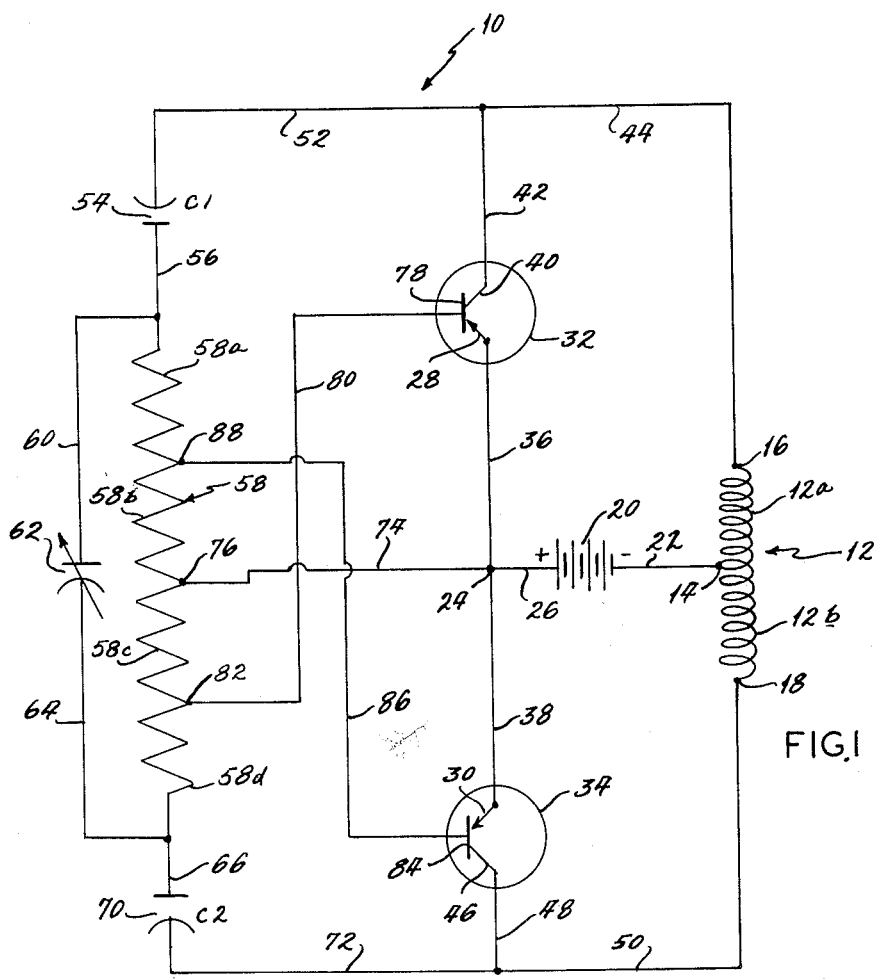
FIG.1
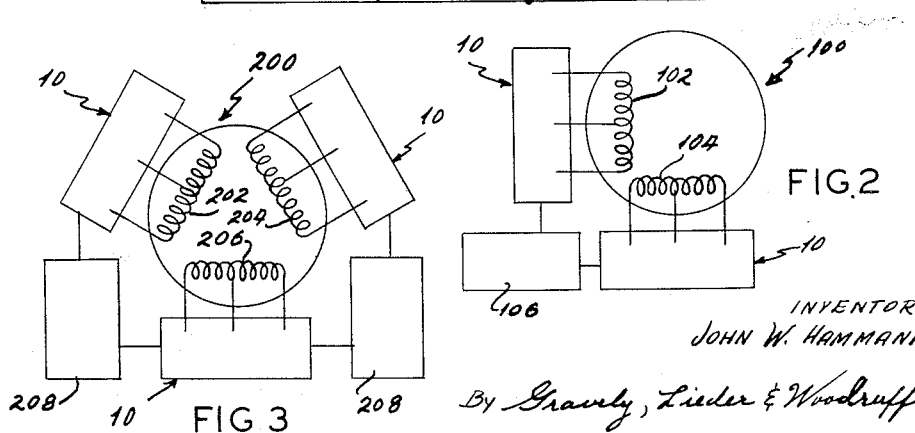
FIG.2
FIG.3
INVENTOR:
JOHN W. HAMMANN
By Gravely, Lieder & Woodruff
ATTORNEYS.

3,090,897
MOTOR CONTROL
John W. Hammann, 4855 Carter Ave., St. Louis 15, Mo.
Filed Apr. 16, 1959, Ser. No. 806,833
4 Claims. (Cl. 318—138)

The present invention relates generally to motor controls and more particularly to a control for an alternating current motor employing oscillator principles and energized by a direct current source.

Various means have been devised in the past for utilizing electronic oscillator principles to control the operation of a motor. The known devices, however, unlike the present device have not been self starting without special devices or cumbersome equipment, have not used the motor winding to load an oscillator, have not employed push-pull oscillator operation using semi-conductors, and have not employed oscillator tuning means to adjust the motor speed. For these and other reasons the present device represents an important advance in the motor art.

It is therefore a major object of this invention to provide an alternating current motor operable from a direct current source.

Another object is to provide relatively simple means of operating a known single or polyphase alternating current motor from a battery or other direct current source.

Another important object is to provide a motor, the windings of which are connected as part of a tuned circuit.

Another object is to eliminate the need for commutators and brushes on motors operated from direct current.

Another object is to provide a motor, the windings of which are connected as parts of tuned circuits.

Another object is to control the operation and speed of a motor by a tunable electronic circuit.

Another object is to use semi-conductor or other electronic devices in the control circuit of a motor.

Another object is to use frequency tuning principles to control the speed of a motor.

Another object is to provide relatively more precise means for adjusting the speed of a motor, which means are capable of adjusting the speed to any value within the range thereof.

Another object is to minimize the number of wear parts in a motor.

Another object is to provide a relatively inexpensive motor construction which can be built in unusually small sizes and ratings with minimum input power requirement, as well as in larger sizes and ratings.

Another object is to provide a motor unusually well suited for use in portable equipment.

Still another object is to provide a motor which can be easily controlled and adjusted to operate in synchronism with other motors.

These and other objects and advantages of the present invention will become apparent after considering the following detailed drawing.

In the drawing:

FIG. 1 is a schematic wiring diagram of a circuit for a motor constructed according to the present invention.

FIG. 2 is a block diagram of a two-phase motor, the windings of which are connected in control circuits constructed according to the present invention, and FIG. 3 is a block diagram similar to FIG. 2, showing application of the present invention to a three-phase motor.

Referring to FIG. 1 in detail, the number 10 refers generally to a motor circuit constructed according to the present invention. The motor circuit 10 has a motor winding 12 connected therein which is divided into portions 12a and 12b, with an intermediate connection 14 between said portions and with end connections 16 and 18. The intermediate connection 14 is connected to the minus terminal of a battery 20 by lead 22 and the plus terminal of the battery 20 is connected to a terminal 24 by lead 26. The terminal 24 is connected by leads 36 and 38 to emitter elements 28 and 30 on semi-conductor elements, or transistors 32 and 34, respectively. The transistor 32 also has a collector element 40 which is connected by leads 42 and 44 to the motor end connection 16; and the transistor 34 has a collector element 46 connected by leads 48 and 50 to the opposite end connection 18 on the motor winding 12.

The collector element 40 on the transistor 32 is also connected via leads 42 and 52 to one side of a capacitor 54, the other side of which is connected by lead 56 to a resistor element 58, and by a parallel lead 60 to one side of an adjustable capacitor 62.

The opposite sides of the capacitor 62 and the opposite side of the resistor 58 are connected via leads 64 and 66 respectively to one side of another capacitor 70. The other side of the capacitor 70 is connected by lead 72 to the junction of leads 48 and 50.

The terminal 24 which is connected to the plus side of the battery 20 is also connected by lead 74 to an intermediate terminal 76 on the resistor 58.

The transistor 32 also has a base element 78 which is connected by a lead 80 to another intermediate terminal 82 on the resistor 58, and the terminal 82 is positioned on the resistor 58 between the terminal 76 and the lead 66 in order to provide proper circuit feed back as will be explained hereinafter. Similarly the transistor 34 has a base element 84 which is connected by lead 86 to a terminal 88 on the resistor 58, which terminal 88 is between the terminal 76 and the lead 56. The circuit that has been described is that of a push-pull amplifier which oscillates at a frequency which is dependent upon the particular elements chosen and, to some extent, on the loading of the motor.

It should be noted that the resistor 58 can be a single resistor element with suitable intermediate connector positions or it can be four separate resistors such as the resistor portions 58a, 58b, 58c and 58d which together comprise the resistor 58.

It is now apparent that the portions 12a and 12b of the motor winding 12 are connected respectively and in series with the battery 20 (or any other suitable direct current source) across the transistors 32 and 34 (from emitter to collector elements), and furthermore are connected in parallel with circuits consisting of the associated capacitor 54 (or 70) and the associated portions of the resistor 58.

The base elements 78 and 84 on the transistors 32 and 34 are connected to intermediate location on the portions of the resistor 58 associated with the circuit of the opposite transistor. This is done to provide positive feed back into the circuits to make the circuits oscillate.

The variable capacitor 62 is connected across the resistor 58 and affects the operation of both oscillator circuits, and also serves as a bypass for the resistor 58 and as convenient means for varying the oscillation frequency and hence the speed of the motor. This is apparent because the capacitor 62 is connected in series with the resistor portions 58c and 58d across the resistor portions 58a and 58b, and similarly is connected in series with the portions 58a and 58b across the portions 58c and 58d. The speed of the motor is also affected by the magnitudes of the resistance portions 58a, 58b, 58c and 58d.

The circuit associated with both transistors 32 and 34 are oscillator circuits and the two separate circuits are constructed and designed to operate in push-pull. The frequency of oscillation of the circuits is determined primarily by the inductance of the motor winding in each circuit and by the capacitance connected in parallel therewith, the combination thereof operating as a resonant inductive-capacitive (L-C) or tank circuit.

The by-pass capacitor 62, the resistor 58 and the semiconductors 32 and 34 also affect the oscillating frequency because they form part of the oscillator circuits. Furthermore, the capacitor 62 permits oscillation at lower frequencies than would otherwise be possible and also serves as a by-pass across the resistor 58 as previously stated.

The taps 82 and 88 on resistor 58 are for the purpose of impedance matching and for controlling the feed back currents. The position of the taps also affects the frequency of oscillation.

The feed back circuits are provided to sustain the oscillations by feeding back some positive amount of energy of the collector-emitter circuit to the base elements 78 and 84 of the other oscillator circuit. To sustain oscillation the energy fed back must be positive at the right instants as is well known.

FIG. 2 shows a typical two-phase motor 100 having windings 102 and 104 both of which are connected to control circuits 10 as described herein. The two control circuits 10 are also shown connected to coupling means 106 which provide substantially 90 degrees phase displacement therebetween.

FIG. 3 shows adaptation of the present control circuit 10 to a three-phase motor 200. In this case also a separate control circuit 10 is connected to each motor winding 202, 204 and 206 and two coupling circuits 208 are provided between the control circuits as shown. Obviously the present control circuit could also be used with other poly-phase motor constructions as well.

While the present device has been illustrated in connection with a particular oscillator circuit employing transistors, it is anticipated that other known types of oscillator circuits could also be constructed using other types of semi-conductor devices, vacuum tubes or thyratrons without departing from the spirit and scope thereof. If the device is constructed using transistors, as shown, it can be made in relatively small sizes capable of occupying minimum space, or it can be made in larger sizes using semi-conductors capable of handling substantial currents. It is also contemplated to employ the present device in conjunction with either the stator or the rotor windings of a motor.

Still further, it is also anticipated that the present device be constructed without using a variable capacitor such as the capacitor 62, in which case it would probably be desirable to make one or both of the capacitors 54 and 70 variable.

Thus it is apparent that there has been shown and described a control circuit for a motor comprising a push-pull oscillator network having resonant circuits formed in part by the windings of a motor itself and energized by a direct current source; which control fulfills all of the objects and advantages sought therefor.

Obviously, many changes, alterations, modifications and variations of the present device can be made by those skilled in the art without departing from the spirit and scope of the invention. All such changes, alterations, modifications and variations which do not depart from the spirit and scope of the invention are deemed covered by the invention which is limited only by the claims which follow.

What is claimed is:

1. A control circuit network for a two phase motor having a pair of phase windings therein comprising an oscillator circuit associated with both of the motor windings, each of said oscillator circuits having a pair of tunable circuits formed in part by a different portion of the motor winding associated therewith, means connecting the tunable circuits in each oscillator circuit for push-pull operation, a source of energy connected to said oscillator circuits, and means in each of said oscillator circuits for changing the frequency of oscillation of the associated tunable circuits.

2. The control circuit defined in claim 1 wherein coupling means are connected between said oscillator circuits to provide phase displacement between the electrical energy in said circuits.

3. A control circuit network for a polyphase motor having a plurality of phase windings comprising an oscillator circuit associated with each of the motor windings, each of said oscillator circuits having a pair of tunable circuits formed in part by different portions of the associated motor winding, means connected said tunable circuits for push-pull operation, a source of direct current energy connected to said oscillator circuits, and coupling means connected between at least two of said oscillator circuits to provide phase displacement between the electrical energy in said circuits.

4. A control circuit network for a polyphase motor having a winding associated with each phase comprising an oscillator circuit associated with each of the motor windings, each of said oscillator circuits having a pair of tunable circuits formed in part by different portions of the associated motor winding, means connecting said tunable circuits associated with each winding for push-pull operation, coupling means connected between at least two of said oscillator circuits to provide positive feedback from one of said circuits to the other to cause said circuits to oscillate, and a direct current energy source connected to said network.

References Cited in the file of this patent

UNITED STATES PATENTS

| | | |
|---|---|---|
| 2,796,571 | Dunn | June 18, 1957 |
| 2,810,843 | Granqvist | Oct. 22, 1957 |
| 2,814,769 | Williams | Nov. 26, 1957 |